United States Patent [19]

Haney et al.

[11] 4,412,683
[45] Nov. 1, 1983

[54] APPARATUS FOR SUPPLYING FLUID TO A ROTATING TUBE COMPRISING END CAP WITH PURGING FLUID

[75] Inventors: Eugene A. Haney, Lawrenceville; Fred P. Partus, Marietta, both of Ga.

[73] Assignee: Western Electric Company, Inc., New York, N.Y.

[21] Appl. No.: 389,329

[22] Filed: Jun. 17, 1982

Related U.S. Application Data

[63] Continuation of Ser. No. 242,775, Mar. 11, 1981, Pat. No. 4,347,069.

[51] Int. Cl.[3] .................... F16J 15/40; F16J 15/44
[52] U.S. Cl. .................................. 277/3; 277/14 R; 277/72 FM; 277/74; 65/3.11; 285/11; 285/96
[58] Field of Search ............... 277/3, 12, 9, 13, 14 R, 277/72 R, 14 V, 135, 72 FM, 226, 74, 79; 65/3.12, 3.2, 3 R, 3 A; 285/11, 96

[56] References Cited

U.S. PATENT DOCUMENTS

| | | | |
|---|---|---|---|
| 331,686 | 12/1885 | Connolly et al. | 285/96 X |
| 1,840,127 | 1/1932 | Penney | 277/72 R X |
| 2,500,295 | 3/1950 | Peirce | 285/96 X |
| 2,690,360 | 9/1954 | Young | 308/36.1 |
| 3,122,373 | 2/1964 | Lee et al. | 277/3 |
| 3,272,516 | 9/1966 | Hoffman | 277/4 |
| 3,494,677 | 2/1970 | Arnis | 308/36.1 |
| 3,576,327 | 4/1971 | Young | 277/226 X |
| 3,889,983 | 6/1975 | Freize et al. | 285/13 |
| 4,140,505 | 2/1979 | Ramsay et al. | 65/3.12 X |
| 4,189,157 | 2/1980 | Mahan et al. | 277/3 |
| 4,203,743 | 5/1980 | Suganuma et al. | 65/3.12 |
| 4,249,221 | 2/1981 | Cox et al. | 360/97 |
| 4,317,667 | 3/1982 | Spainhour | 65/3.12 X |
| 4,358,937 | 11/1982 | Okamoto et al. | 277/3 X |
| 4,368,895 | 1/1983 | Okamoto et al. | 277/3 X |

FOREIGN PATENT DOCUMENTS

| | | | |
|---|---|---|---|
| 74806 | 10/1952 | Denmark | 277/72 |
| 1485742 | 5/1967 | France | 277/74 |

Primary Examiner—Robert S. Ward, Jr.
Attorney, Agent, or Firm—David P. Kelley

[57] ABSTRACT

Apparatus for supplying fluid to a rotary tube uncontaminated with ambient air comprises an end cap having an open ended bore in which an end portion of the tube may be rotatably positioned, a first conduit extending into the end cap through which fluid may be fed into the rotary tube, and a second conduit communicating with the end cap bore through which a purge fluid may be fed into and at least partially through the bore to the exterior of the end cap.

6 Claims, 2 Drawing Figures

APPARATUS FOR SUPPLYING FLUID TO A ROTATING TUBE COMPRISING END CAP WITH PURGING FLUID

This is a continuation of application Ser. No. 242,775 filed Mar. 11, 1981, now U.S. Pat. No. 4,347,069 issued Aug. 31, 1982.

TECHNICAL FIELD

This invention relates to apparatuses for supplying fluids to rotating tubes such as is done in the manufacture of optical fiber preforms.

BACKGROUND OF THE INVENTION

Some industrial processes call for the introduction of fluids into rotating tubes. In many such situations it is desirable, if not essential, that this be done without ambient matter becoming entrained with the fluid as it flows from a stationary conduit into the rotating tube.

For example, in constructing preforms from which optical fibers may be drawn, vapors of materials such as $SiCl_4$, $GeCl_4$, $BCl_3$ and $POCl_3$ are entrained in an oxidizing carrier gas such as oxygen. The vapor stream is then drawn through a stationary conduit and into a rotating glass preform tube. In order to inhibit the vapor stream from leaking to ambient atmosphere, and ambient air from entering and thereby contaminating the vapor stream, a rotary seal has been provided at the junction of the stationary and rotary tubes. This seal has been provided by locating an end portion of one of the tubes within an end portion of the other tube and positioning one or more resilient O-rings or washers between the two tubes. However, this arrangement has been less than satisfactory since at least one of the tubes is constantly rubbing against the resilient O-rings causing them to become heated and to wear out. Structural deterioration of the O-rings, of course, soon leads to leakage which is aggravated whenever, as here, there is a pressure differential between the fluid stream and ambient. Furthermore, in such highly controlled situations as optical fiber preform manufacture even a very slight leak can create severe problems. For example, a leak PPM to ambient surrundings can endanger personnel since the vapor stream is toxic. Such leakage also alters the rate of vapor stream flow into the preform which rate must be precisely controlled. Conversely, an ingress of ambient air will also alter the flow rate as well as contaminate the vapor stream with water vapor.

Thus, it is desirable to provide improved apparatuses for supplying a rotating tube with fluid uncontaminated with ambient air such as is done in fabricating optical fiber preforms. It is this task to which the present invention is primarily directed.

In one form of the invention a protective end member is provided for a rotatable tubular member. The protective end member has a housing formed with a bore therein of greater inside dimensions than the outside dimensions of the tubular member for receiving an end of the tubular member without making contact with it. Means are provided within the housing for permitting the introduction of fluid into the interior of the tubular member. Means are also provided within the housing for permitting the introduction of a purging fluid into the housing bore at a pressure in excess of ambient pressure to prevent contaminating materials from being introduced into the interior of the tubular member from the ambient atmosphere.

In another form of the invention apparatus is provided for supplying fluid to a rotary tube substantially uncontaminated with ambient air. The apparatus comprises an end cap having an open ended bore in which an end portion of the tube may be rotatably positioned. First conduit means extend into the end cap through which fluid may be fed into the rotary tube. Second conduit means communicate with the end cap bore through which a purge fluid may be fed into and at least partially through the bore to the exterior of the end cap.

In still another form of the invention apparatus is provided for inhibiting ambient air from entering an end of a rotatable tube into which a stream of fluid is to be delivered. The apparatus comprises an end cap adapted to be positioned closely about an end portion of the rotatable tube so as to form a generally annular channel therebetween which communicates with the exterior of the end cap. The end cap defines a first passage through which a first stream of fluid may flow into the rotatable tube and a second passage through which a second stream of fluid may flow into and through the annular channel to the exterior of the end cap.

DETAILED DESCRIPTION

Figure 1:
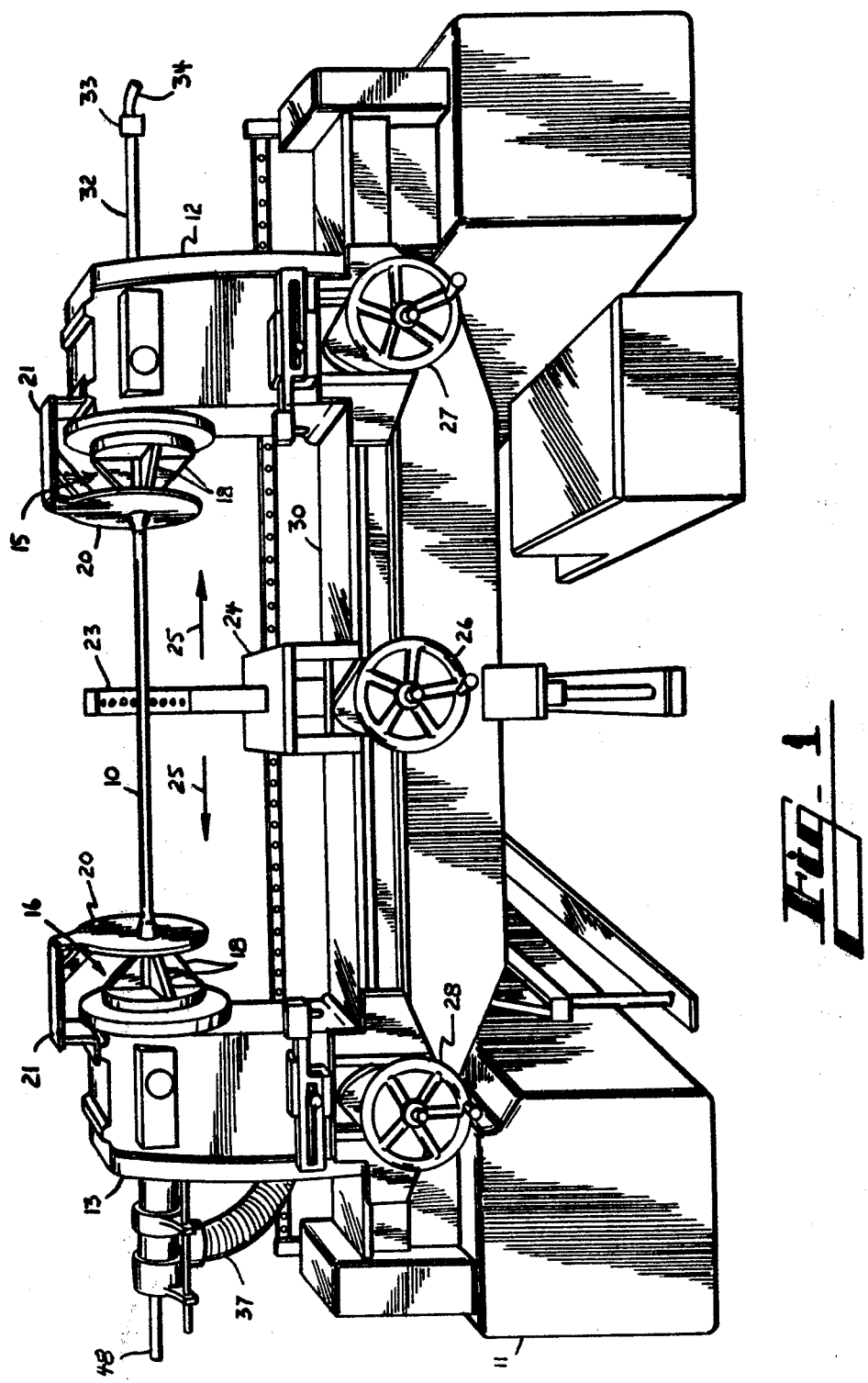
FIG. 1 is a perspective view of a lathe to which an optical fiber preform tube is rotatably mounted for chemical vapor deposition.

Referring now in more detail to the drawing, there is shown in FIG. 1 a lathe for forming an optical fiber preform by a vapor deposition process wherein chemical reaction products are deposited on the interior surface of a glass preform tube 10. The lathe includes a frame 11 atop which a headstock 12 and a tailstock 13 are mounted. The headstock 12 and its internal mechanisms rotatably support and drive a chuck 15 while the tailstock 13 and its internal mechanisms similarly rotatably support and drive chuck 16 about a common axis with that of chuck 15. Each of the chucks is comprised of radially spaced jaws 18 which are adpated to be moved into and out of gripping engagement with the preform tube or with a tubular extension thereof. Centrally apertured heat shields 20 are mounted by pendants 21 to both stocks closely adjacent the rotatable chucks. A hydrogen-oxygen torch 23 is mounted atop a carriage 24 for reciprocal movement between the two heat shields 20 as indicated by arrows 25. The torch 23 is reciprocated by an unshown automated drive mechanism which can be manually over-ridden and positioned by a handwheel 26. Similarly, the lateral position of the headstock 12 may be adjusted by a handwheel 27 atop a rail 30 while the position of the tailstock may be manually adjusted over the rail by movement of handwheel 28. A rotary conduit 32 projects laterally from the headstock 12 to a rotary seal 33 and junction with a stationary conduit 34. The conduit 34 extends to an unshown vapor stream supply source. An exhaust hose 37 extends from the tailstock while a scrapper rod 48 extends into the tailstock for cleaning.

Figure 2:
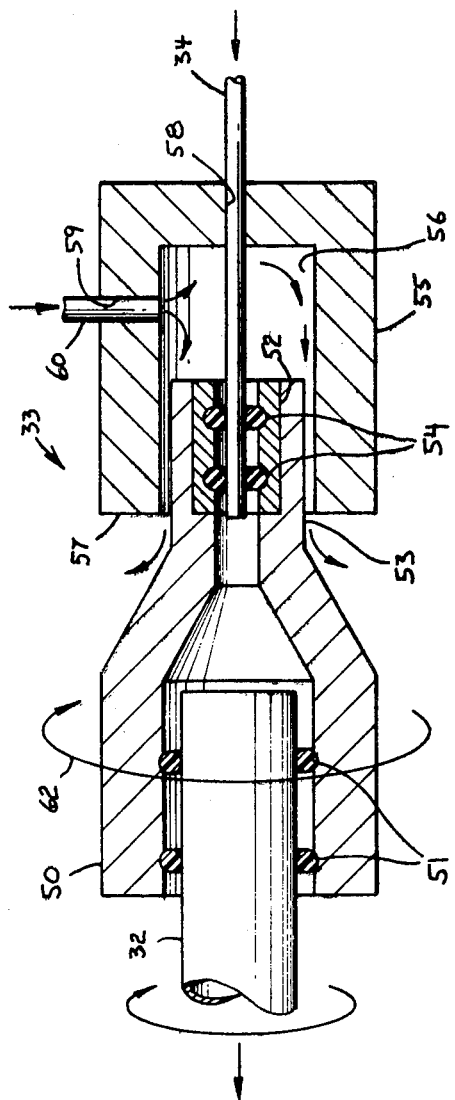
FIG. 2 is a side elevational view, in cross-section, of the sealed junction or joint of the rotatable and stationary members of the apparatus illustrated in FIG. 1 which joint is also referred to herein as a rotary seal.

FIG. 2 provides a detailed illustration of the rotary seal or joint 33. The seal includes a tubular member 50 which is rigidly mounted to the rotatable conduit 32 by a compression fit about two O-rings 51 sandwiched between the tubular member and conduit. Here the conduit 32 is an extension of the preform tube 10. Alternatively, the seal 33 may be positioned within the headstock 12 with the end of the glass preform tube 10 itself mounted within the rotatable member 50.

The rotatable member 50 is seen to have a neck portion 53 whose outer surface is cylindrical and of reduced outsdie diameter. A tubular insert 52 is press-fitted into an end of the neck portion 53. This insert is formed with two axially spaced grooves in which a pair of resilient O-rings 54 are seated.

The rotary seal is seen further to include an end cap or housing 55 having a cylindrical internal wall 56 which defines a bore that is open-ended to ambient atmosphere at one end 57. The cylindrical bore has an inside diameter slightly greater than the outside diameter of the neck portion 53 of the rotatable tube 50. The end cap is provided with a passage 58 coaxially that of the cylindrical bore through which a conduit 34 extends into the rotatable tube neck portion 53 and through the two O-rings 54. The end cap has another passage 59 through which another conduit 60 extends from an unshown source of compressed oxygen.

During chemical vapor deposition the preform tube 10 is rotated by chucks 15 and 16. A stream of the aforementioned vapors, most of which are toxic, entrained with oxygen as a carrier gas, is formed into the preform tube 10 by positive pressure provided by an unshown vapor stream generator located upstream of conduit 34. As the vapor stream is passed through the preform tube 10 the torch 23 is slowly moved along the rotating preform tube thereby causing a chemical reaction to occur within the band of heat created by the torch, and the products of the reaction to be deposited on the interior surface of the tube. The carrier gas, along with any undeposited reaction products, is exhausted out of the preform tube 10 through the exhaust tube 37 to which suction is applied.

As the deposition process progresses the rotatable tube 32 and its tubular extension 50 are rotated by the chuck 15 as indicated by arrow 62. As this occurs the tubular neck portion 53, the tubular insert 52 and the two O-rings 54 also rotate about the stationary conduit 34. Oxygen is introduced into the end cap bore through conduit 60 at a pressure in excess of ambient air pressure and that of the vapor stream flowing through the sealed joint. From here the oxygen flows through the annular channel located between the end cap interior wall 56 and the exterior cylindrical wall of the rotatable member neck portion 53 to ambient. The pressure of the oxygen within the end cap is also above the pressure of the vapor stream flowing through the conduit 34 and into conduit 32. As a result the toxic vapor stream is inhibited from leaking outwardly through the O-rings into the end cap bore and then to the ambient atmosphere due to this presssure differential. Conversely, the O-rings also serve to inhibit the oxygen from flowing inwardly into the rotatable member 50 and the vapor stream. However, should any of the oxygen seep past the O-rings and into the vapor stream the qualitative compositional makeup of the vapor stream is unaltered. In such cases there would be a slight increase in the percentage of oxygen as the carrier gas to the toxic vapor entrained therewith. However, with the flow rate of the vapor stream being substantially greater than the flow rate of the purging oxygen being inputted through conduit 60, the change in the ratio of carrier gas to vapor is very slight. In this manner the composition of the vapor stream is prevented from being contaminated by ambient air and the moisture which it contains. Since oxygen is a constituent of the vapor stream the qualitative composition of the stream is maintained. At the same time there is little if any risk of toxins escaping from the vapor stream and thereby endangering personnel or damaging property located in the vicinity of the rotary seal.

It should be understood that the just described embodiment merely illustrates principles of the invention in a preferred form. The words "stationary" and "rotary" are used herein are intended to be mutually relative terms. Furthermore, for ease of expression air has been used as the ambient fluid medium in which the rotary seal is located. In other circumstances, of course, the ambient atmosphere could be other than that of air such as an inert gas. In addition the various fluids described have been gaseous; however, liquid fluids could be used in other applications. Thus, it is apparent that many additions, deletions and modifications may be made to the methods and apparatuses particularly described without departure from the spirit and scope of the invention as set forth in the following claims.

What is claimed is:

1. A protective end member for a rotatable tubular member comprising a housing having a bore therein of greater inside dimensions than the outside dimensions of the tubular member for receiving an end of said tubular member without making contact therewith, means within said housing for permitting the introduction of fluid into the interior of said tubular member, and means within said housing for permitting the introduction of a purging fluid into said housing bore at a pressure in excess of ambient pressure to prevent contaminating materials from being introduced into the interior of said tubular member from ambient atmosphere.

2. Apparatus for supplying fluid to a rotary tube substantially uncontaminated with ambient air, and with said apparatus comprising an end cap having an open ended bore in which an end portion of the tube may be rotatably positioned; first conduit means extending into said end cap through which fluid may be fed into the rotary tube; and second conduit means communicating with said end cap bore through which a purge fluid may be fed into and at least partially through said bore to the exterior of said end cap.

3. An end cap for inhibiting ambient air from entering a rotatable tube and with said end cap having a bore that communicates with ambient atmosphere in which the tube end may be rotatable positioned, a first passage through which a first stream of fluid may be channeled into the rotatable tube, and a second passage through which a second stream may be channeled into and through said bore about the tube end to ambient atmosphere.

4. Apparatus for inhibiting ambient air from entering an end of a rotatable tube into which a stream of fluid is to be delivered, and with said apparatus comprising an end cap adapted to be positioned closely about an end portion of the rotatable tube so as to form a generally annular channel therebetween which communicates with the exterior of said end cap, and with said end cap defining a first passage through which a first stream of fluid may flow into the rotatable tube and a second passage through which a second stream of fluid may flow into and through said annular channel to the exterior of said end cap.

5. Apparatus in accordance with claim 4 further comprising a conduit extending through said end cap first passage and coaxially through the annular channel through which the first stream of fluid may flow into the rotatable tube.

6. Apparatus in accordance with claim 5 further comprising a resilient O-ring mounted about an end portion of said conduit to inhibit comingling of the first and second streams of fluid.

* * * * *